United States Patent [19]

Weber

[11] Patent Number: 5,492,396

[45] Date of Patent: *Feb. 20, 1996

[54] METHOD FOR SPLIT-TO-HIGH MU DETECTION AND CONTROL FOR ANTI-LOCK BRAKE SYSTEMS

[75] Inventor: Darryl C. Weber, Ann Arbor, Mich.

[73] Assignee: Kelsey-Hayes Company, Livonia, Mich.

[*] Notice: The term of this patent shall not extend beyond the expiration date of Pat. No. 5,358,319.

[21] Appl. No.: 390,552

[22] Filed: Feb. 17, 1995

Related U.S. Application Data

[62] Division of Ser. No. 100,551, Jul. 30, 1993, Pat. No. 5,419,623.

[51] Int. Cl.$^6$ ............................... B60T 8/32; B60T 8/84
[52] U.S. Cl. ............... 303/149; 188/181 C; 364/426.01
[58] Field of Search ................. 180/197; 364/426.01, 364/426.02, 426.03; 303/94, 95, 96, 97, 98, 99, 149, 150, 157, 158, 159, 91, 103–111; 188/181 C

[56] References Cited

U.S. PATENT DOCUMENTS

| 5,224,766 | 7/1993 | Oikawa et al. | 303/100 |
| 5,358,319 | 10/1994 | Negrin | 303/103 |
| 5,419,623 | 5/1995 | Weber | 303/149 |

Primary Examiner—Douglas C. Butler
Attorney, Agent, or Firm—Brooks & Kushman

[57] ABSTRACT

A method is provided for modifying anti-lock brake control to a vehicle braking on a surface having a split-mu to higher-mu transition. The time duration of the apply stage of an anti-lock brake system cycle is measured for the two front wheels. The measured apply stage durations are compared to a selected threshold. The transition from the split-mu surface to the higher-mu surface is detected when the apply stage duration for the lower-mu wheel exceeds the selected threshold. An increased brake pressure rate is applied to both front wheels when the split-mu to high-mu transition is detected.

15 Claims, 4 Drawing Sheets

METHOD FOR SPLIT-TO-HIGH MU DETECTION AND CONTROL FOR ANTI-LOCK BRAKE SYSTEMS

CROSS REFERENCE TO RELATED APPLICATION

This application is a divisional of application Ser. No. 08/100,555, filed Jul. 30, 1993, now U.S. Pat. No. 5,419,623. This application is also related to application Ser. No. 08/100,128, filed Jul. 30, 1993, now U.S. Pat. No. 5,358,319, commonly assigned with the present invention.

TECHNICAL FIELD

This invention relates to anti-lock brake systems, and more particularly, to the control employed by anti-lock brake systems for braking on surfaces with varying coefficients of friction.

BACKGROUND ART

When the brakes are applied on a vehicle traveling on a surface at a given velocity, braking torques are generated at each of the braked wheels. The braking torque causes a retarding or braking force to be generated at the interface between the tire and the surface. The braking forces generated at the wheels then cause a decrease in the vehicle velocity.

Ideally, the braking forces at the wheels increase proportionately as the driver increases the force on the brake pedal. Unfortunately, this is not always the case in braking procedures. As the braking torque and hence the braking force at the wheel is increased, the rotational speed of the braked wheels becomes less than the speed of the vehicle. When the rotational speed of a wheel is less than the vehicle speed, "slippage" is said to occur between the tire and the surface. With further increase in brake torque, the slippage between the tire and the surface increases until lock-up and skidding of the wheel occurs. In most cases, lock-up causes an increase in stopping distance. Lock-up also causes a degradation in directional control due to a reduction in the lateral forces at the wheels.

Both of these problems associated with lock-up were addressed with the advent of anti-lock brake systems (ABS). A basic anti-lock brake system monitors the velocity at the each of the wheels, decides whether the wheel is excessively slipping based on these velocity measurements, and modulates the braking pressure accordingly to avoid lock-up. The ABS aids in retaining vehicle stability and steerability while providing shorter stopping distances.

One method by which the state of excessive slipping is identified in the ABS is comparing the velocity of each wheel to a reference speed. The reference speed is an estimate of the true vehicle speed based on current and previous values of the individual wheel velocities. If the velocity of a wheel is significantly less than the reference speed, then the wheel is deemed by the ABS to be excessively slipping. The ABS then reduces the pressure actuating the brake in order to reduce brake torque. The reduction of brake torque allows the friction force at the surface to accelerate the wheel, thereby causing a reduction of the slip in the wheel. Similarly, other criteria can be considered in determining the presence of excessive slip.

After a period of constant braking pressure following the pressure reduction, the pressure actuating the brake is increased until excessive wheel slip occurs again. The cycle of decreasing the brake pressure, maintaining constant brake pressure, and then increasing brake pressure is repeated until the antilock event ends. The parameters which define the specifics of this cycle depend on both the vehicle and the surface conditions.

For the present invention, the braking of a vehicle on a surface with varying coefficient of friction is considered. The coefficient of friction, mu, of a surface is defined as the ratio of the braking force generated at the interface between the tire and the surface, to the normal force between the tire and the surface.

Three classes of surfaces can be defined qualitatively in terms of mu: high-mu, low-mu, and split-mu. A high-mu surface is one which produces relatively good braking ability. Dry asphalt is an example of a high-mu surface. A low-mu surface is characterized by its resulting in poor braking ability. An example of a low-mu surface is a road covered with snow or ice. A split-mu surface is encountered when a vehicle has one or more tires on a latitudinal axis on a low-mu surface and the other tire or tires on the same latitudinal axis on a high-mu surface. An example of a split-mu surface is a road with snow or ice on one side of the vehicle and dry asphalt on the other side of the vehicle.

In relative terms, the coefficient of friction, mu, can also be expressed as a variation from a current or reference mu. Specifically, a higher-mu surface is a surface whose mu is greater than the reference and a lower-mu surface is a surface whose mu is less than the reference.

An example of braking on a split-mu to higher-mu transition can be envisaged based on the previous examples. Consider a vehicle braking on a surface where the left tires are exposed to a cleared section of the road (e.g. asphalt) while the right tires are exposed to snow. In split-mu control, the brake on the right wheel is controlled cyclically while the pressure apply rate to the brake of the left wheel is restricted. After a distance of split-mu braking, the right tires also become exposed to the cleared section of the road. As the vehicle makes the transition from the split-mu surface to the higher-mu surface, the brake pressure at the wheel on the previously lower-mu side (here, the right side) begins to increase in order to increase deceleration. However, the increase in brake pressure causes a torque imbalance with the opposite wheel whose pressure is restricted (here, the left wheel).

SUMMARY OF THE INVENTION

The need exist within an anti-lock brake system for increasing the brake pressure to the wheel opposite the newly higher-mu wheel, so as to avoid a torque imbalance with the newly higher-mu side of a vehicle braking on a split-mu to higher-mu transition.

It is thus an object of the present invention to provide a method and system for increasing the brake pressure to the wheel opposite to the newly higher-mu wheel of a vehicle braking on a split-mu to higher-mu transition during an anti-lock brake system event.

A further object of the present invention is to provide a method and system for detecting a transition from a split-mu surface to a higher-mu surface during an anti-lock brake system event.

In carrying out the above objects, the present invention provides a method of detecting a transition from a split-mu surface to a higher-mu surface during an anti-lock brake system event of a vehicle, the vehicle comprising two wheels aligned on a latitudinal axis of the vehicle and an anti-lock brake system capable of independent cyclic control of brake pressure to each of the wheels with at least one pressure apply stage per cycle, the split-mu surface being characterized by one of the two wheels on a lower-mu surface. The method comprises the steps of measuring a time duration, the time duration defined in terms of an anti-lock brake system cycle for the lower-mu wheel, comparing the time duration to a selected threshold, and detecting a split-mu to higher-mu transition if the time duration exceeds the selected threshold.

In further carrying out the above objects, the present invention provides a method of modifying an anti-lock brake control to a vehicle braking on a transition from a split-mu surface to a higher-mu surface during an anti-lock brake system event, the vehicle comprising two wheels aligned on a latitudinal axis of the vehicle and an anti-lock brake system capable of independent cyclic control of brake pressure to each of the wheels with at least one pressure apply stage per cycle, the split-mu surface being characterized by one of the wheels on a lower-mu surface and the other wheel on a higher-mu surface. The method comprises the steps of measuring a time duration, defined in terms of an anti-lock brake system cycle for the lower-mu wheel, comparing the time duration to a selected threshold, detecting a split-mu to higher-mu transition if the time duration exceeds the selected threshold, executing a low-to-high control on the lower-mu wheel, and executing a split-to-high control on the higher-mu wheel.

Moreover, in carrying out the above objects, the present invention provides systems for implementing the corresponding methods.

DETAILED DESCRIPTION OF THE INVENTION

Figure 1:
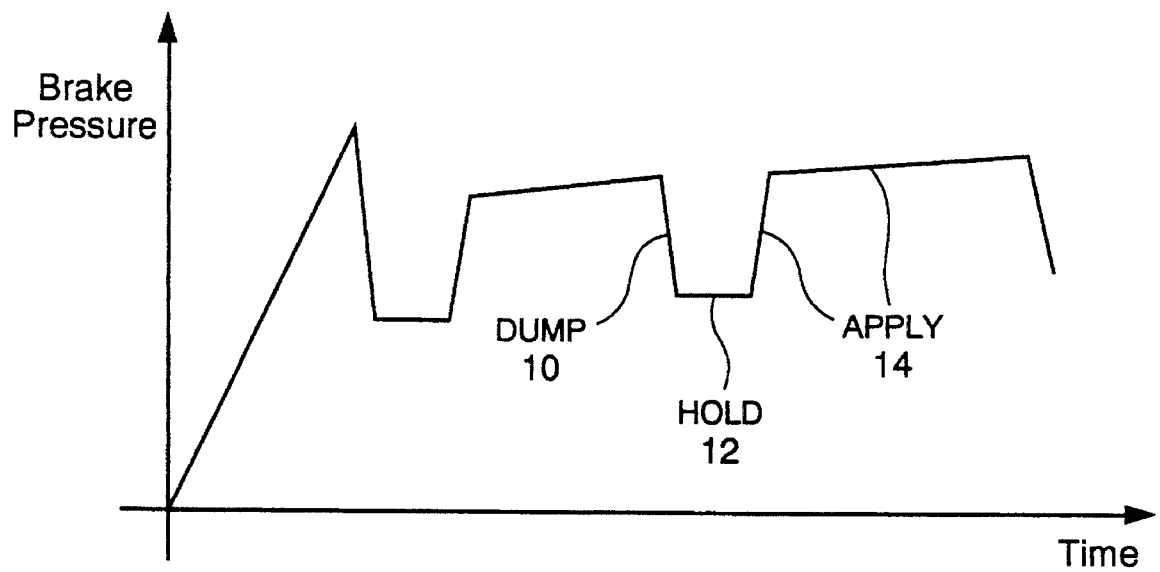
FIG. 1 shows an example of brake pressure cycling during an anti-lock brake system event.

FIG. 1 shows an example of brake pressure cycling that occurs during an ABS event. A cycle consists of: a dump stage 10 where the brake pressure is decreasing with time, a hold stage 12 where the brake pressure is nearly constant, and an apply stage 14 where the brake pressure is increasing with time. The cycle is formed as follows. When excessive slip occurs in a wheel, the ABS initiates the dump stage 10. Pressure is reduced in the brake, thus reducing the slip in the wheel. The brake pressure is then held constant in the hold stage 12, allowing the wheel to accelerate and approach the velocity of the vehicle. The apply stage 14 then increases the brake pressure in order to retard the motion of the vehicle. If the apply stage 14 causes excessive slip in the wheel, then the cycle repeats.

It should be noted for this and the following discussions, that the term "wheel" will be used to describe one or more wheels that are affixed to one another. Thus, two wheels affixed to one another and attached to one end of an axle, such as is found on the rear axles of many large trucks, will be considered as a single "wheel".

An indication of a change in the magnitude of the braking coefficient mu can be obtained by measuring the amount of time spent in the apply stage 14. An increase in apply stage duration for a particular wheel or a set of wheels while on a lower-mu surface can indicate the transition from a lower-mu surface to a higher-mu surface. This occurs because of the relative ease of producing wheel departure (excessive slip) on lower-mu surfaces as compared with higher-mu surfaces, and because wheel departure initiates the dump stage 10.

While on a split-mu surface, the method of the present invention employs an apply time threshold to a lower-mu wheel. An apply time above the threshold is considered to be produced by a transition to a higher-mu surface. Similarly, an apply time below the threshold is considered to be produced by a continuation of the lower-mu surface indicative of a continuation of the split-mu condition.

Figure 2:
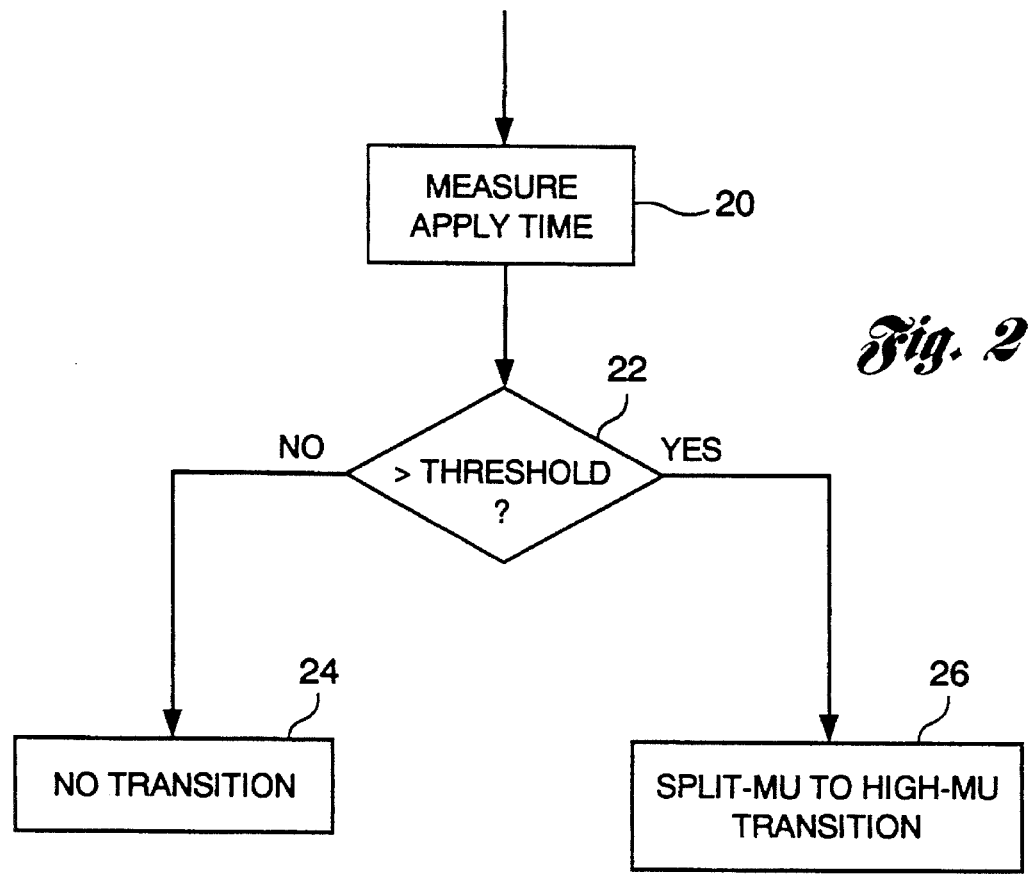
FIG. 2 shows a flow chart representation of one embodiment of the method of determining a transition from a split-mu to high-mu surface of the present invention.

FIG. 2 shows a flow chart of the method for determining whether the lower-mu wheel has made the transition to higher-mu. It is assumed that the vehicle is on a split-mu surface, that is, one wheel is on a lower-mu surface and a second wheel on the same latitudinal axis, but on the opposite side of the vehicle is on a higher-mu surface. In response to the lower-mu surface, the brake to the lower-mu wheel is being cyclically controlled. Given the higher-mu surface, the brake to the higher-mu wheel is, however, generally not being cyclically controlled.

The apply time, specifically the amount of time spent in the apply stage in the previous cycle, is measured in block 20. Block 22 compares the measured apply time with a selected threshold. If the apply time is less than the threshold, a determination of no transition is reached as shown in block 24. If the apply time is greater than the threshold, then a determination of lower-mu to higher-mu transition on the lower-mu wheel is reached as shown in block 26, indicative of an overall split-mu to higher-mu transition of the vehicle in the preferred embodiment of the present invention.

While the apply time is used, in the preferred embodiment, as an indicator for determining a transition from a split-mu surface to a higher-mu surface, one with ordinary skill in the art will recognize that other time durations derived from an anti-lock brake system cycle could be similarly used.

Given the method for detecting the split-mu to high-mu transition, a method for modifying the anti-lock brake control is formulated as follows. When a split-mu to higher-mu transition is detected, a low-to-high pressure control is applied to the brake of the wheel newly qualified as higher-mu and a split-to-high pressure control is applied to the brake of the opposite wheel.

Figure 3:
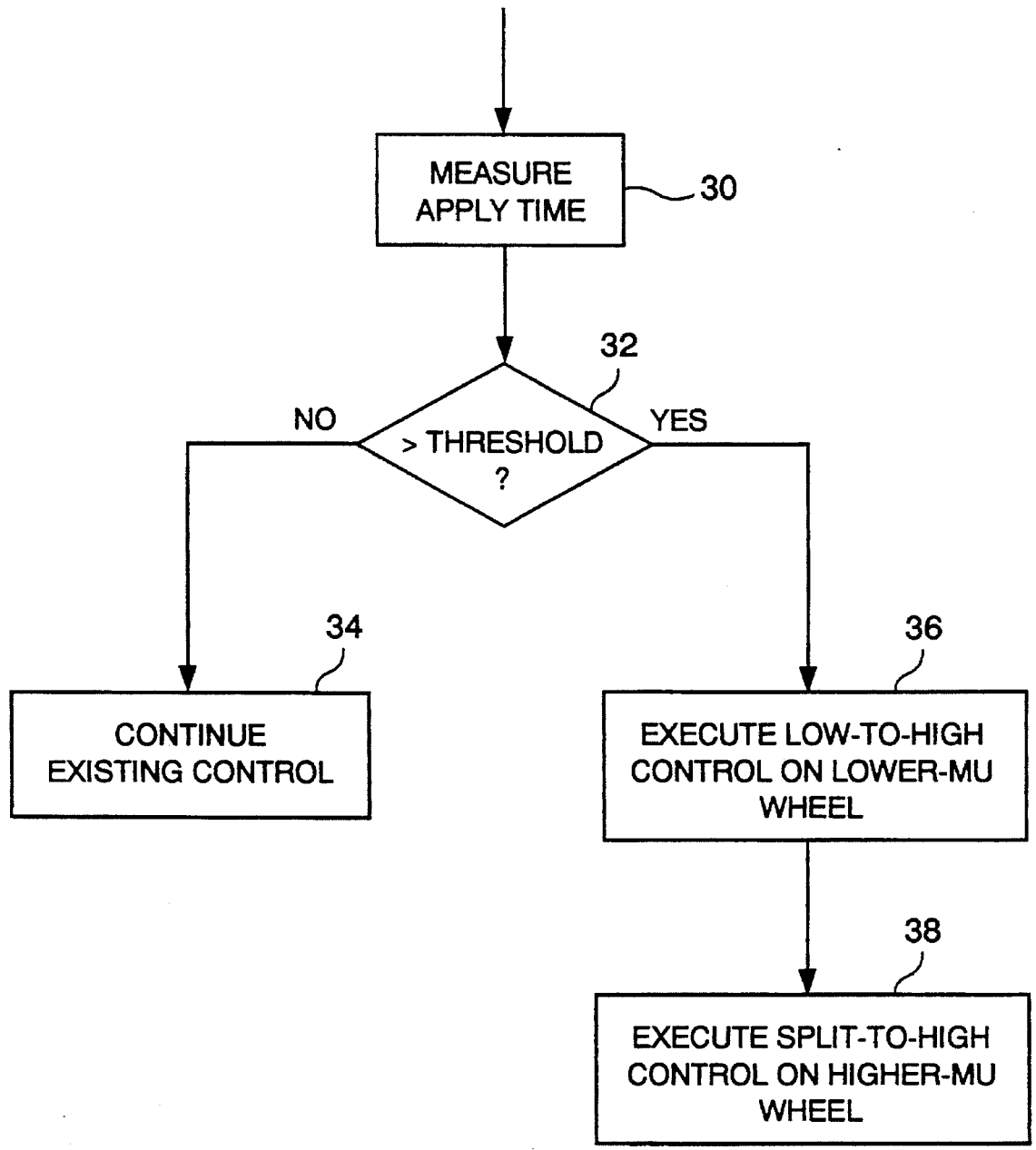
FIG. 3 is a flow chart representation of one embodiment of the split-to-high-mu control method of the present invention.

FIG. 3 shows a flow chart representation of an embodiment of the split-to-high control method subroutine for two wheels of a vehicle. In the preferred embodiment, these two wheels are the right front and the left front wheel of a four-wheeled vehicle. However, it should be noted that the present invention would apply to the control of any two wheels on a latitudinal axis of the vehicle such as two rear wheels or two wheels on some intermediate vehicle axle which are individually controllable by the anti-lock braking system.

It is assumed that the vehicle is on a split-mu surface, that is, one wheel is on a lower-mu surface and a second wheel on the same latitudinal axis, but on the opposite side of the vehicle is on a higher-mu surface. In response to the lower-mu surface, the brake to the lower-mu wheel is being cyclically controlled. Given the higher-mu surface, the brake to the higher-mu wheel is, however, generally not being cyclicaly controlled.

First, the subroutine is entered at block 30. The amount of time that the lower-mu wheel has been in the apply mode during its current ABS cycle is examined in conditional block 32. In the preferred embodiment, the apply mode time is measured in terms of some apply time count, with the value of the apply time count supplied by the main ABS routine.

If the apply time count is less than a selected threshold, then normal pressure control is applied to both the lower-mu wheel, and the higher-mu wheel, as shown in block 34, consistent with the continuation of the split-mu surface. This normal pressure control may be characterized by cyclic control of the lower-mu wheel and by some alternate control scheme for the higher-mu wheel. For a further discussion of the ABS control under split-mu surfaces see co-pending application "Method and System for Low-to-Split Mu Control for Anti-Lock Brake Systems" hereby incorporated by reference.

Referring again to FIG. 3, if the apply time count is greater than the selected threshold, then a low-to-high control is executed on the lower-mu wheel as shown in block 36, and a split-to-high control is executed on the higher-mu wheel as shown in block 38.

Figure 4A:
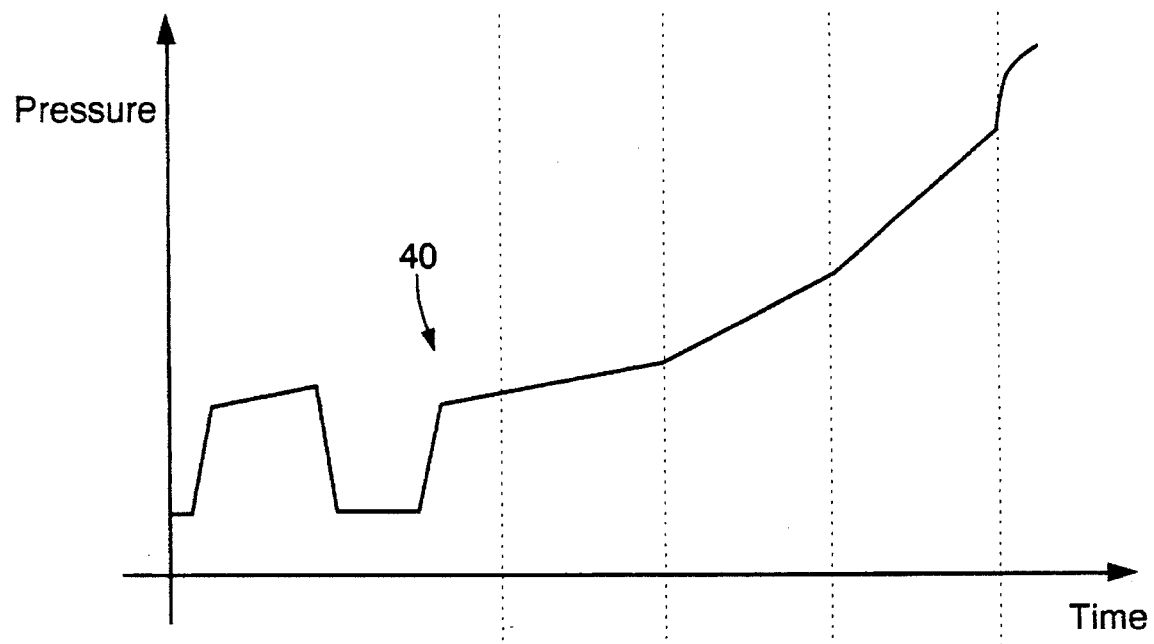
FIGS. 4a and 4b are graphical representations of one embodiment of the split-to-high-mu control method of the present invention.
Figure 4B:
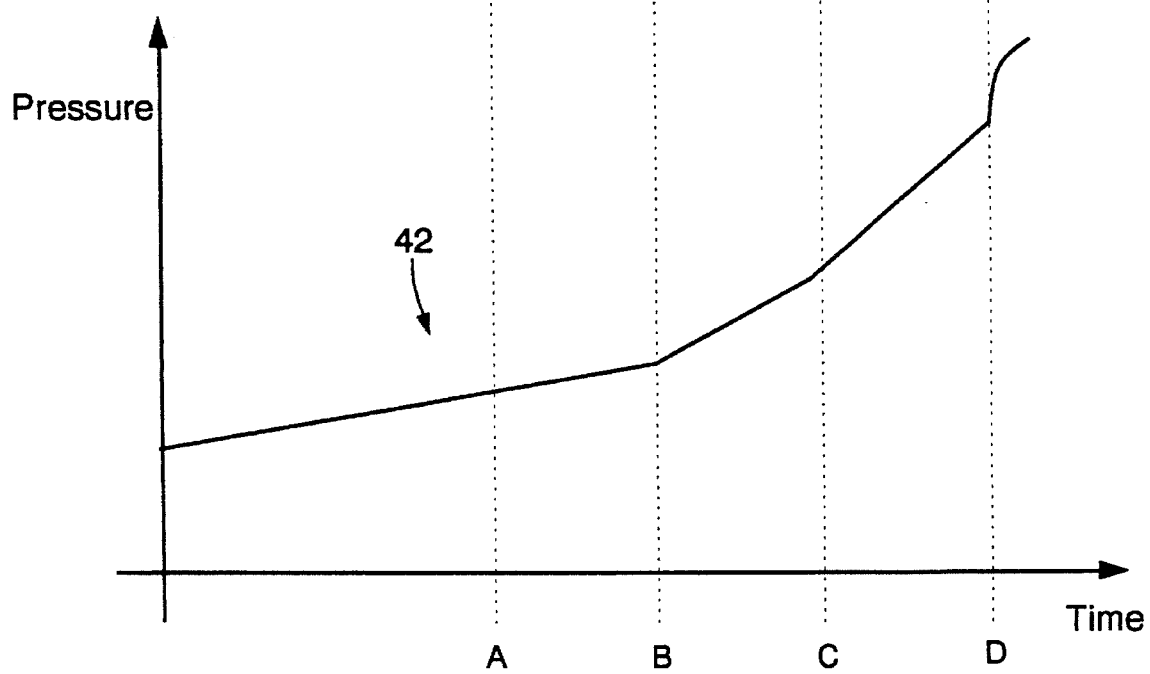

Turning now to FIGS. 4a and 4b, a graphical representation of a method of modifying an ABS control in response to a transition from a split-mu surface to a higher-mu surface of one embodiment of the present invention. Pressure profile 40 relates to a pressure control of the brake on the lower-mu wheel while pressure profile 42 relates to a pressure control of the brake on the higher-mu wheel. Initially, the lower-mu wheel is under cyclic control while the higher-mu wheel is not under cyclic control.

At time A, a transition occurs on the lower-mu wheel from a lower-mu surface to a higher-mu surface. This transition is observed at time B when the apply time of the low-mu wheel exceeds the selected threshold. At this point, the pressure to the brake on the lower-mu wheel is increased during a first pressure stage. At time C, the pressure to the brake of the lower-mu wheel is increased more aggressively until point D where the anti-lock brake event is terminated. An isolation valve, isolating the pressure of the lower-mu wheel from the brake master cylinder is opened causing the pressure to the lower-mu wheel to assume the generally higher master cylinder pressure.

A similar pressure control is implemented on the higher-mu wheel which is transitioning from split-mu control to higher-mu control. In this embodiment of the present invention, the pressure controls are synchronized, though, the control of one wheel may be delayed with respect to the other wheel to avoid difficulties associated with simultaneous control. Practically speaking, the control of the low-to-high control of the lower-mu wheel and the split-to-high control of the higher-mu wheel need not be identical as long as the problems associated with torque imbalance are avoided.

Further, the specific control strategies shown in FIGS. 4a and 4b, illustrate merely one of a wide variety of different control responses. One with ordinary skill in the art will recognize that many different aggressive control strategies will serve the purposes of providing a smooth and efficient transition from split-mu to a higher-mu surface. Examples of such control strategies include a single stage aggressive control such as an increasing linear, parabolic, cubic, exponential or other similar curve. Similarly, the aggressive application of pressure can be accomplished in two or more separate pressure stages. Finally, the aggressive pressure application could end with a termination of the anti-lock event for the two wheels under consideration.

It should be noted that while the embodiments presented above relate to a method of ABS control, these methods could be implemented in software executed by a microprocessor or similar device commonly used to implement ABS control on a vehicle.

Figure 5:
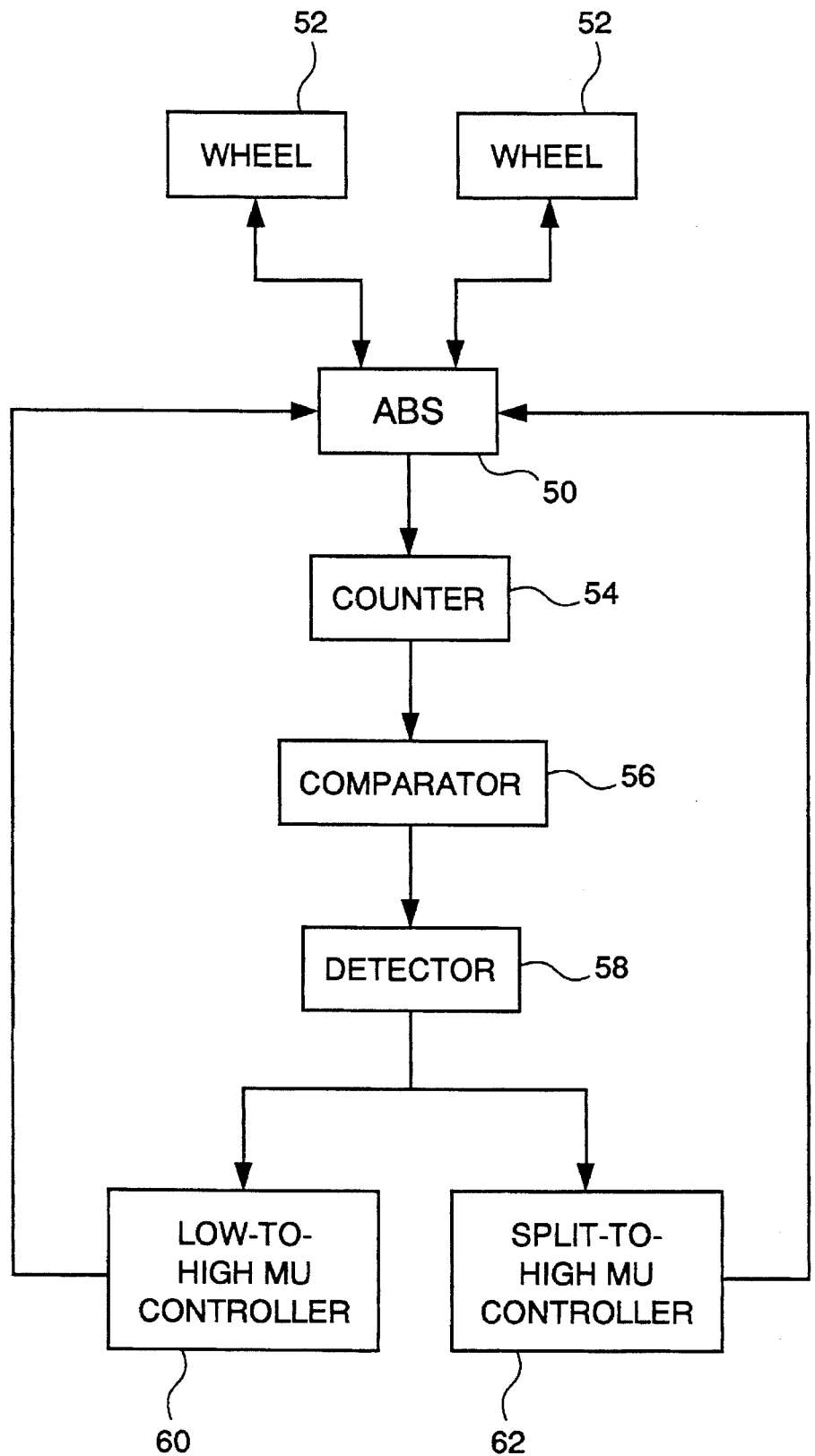
FIG. 5 is a block diagram of the present invention.

For example, FIG. 5 is a block diagram illustrating the system of the present invention. The ABS 50 coupled to the wheels 52 of the present invention includes a counter 54 for measuring a time duration, defined in terms of the anti-lock brake system cycle for the lower-mu wheel.

The counter 54 is coupled to a comparator 56 for comparing the time duration measured by the counter 54 to a predetermined threshold. The comparator 56 is coupled to a detector 58 for detecting a split-mu to higher-mu transition if the time duration measured by the counter 54 exceeds the predetermined threshold.

Coupled to the detector 58 are two controllers 60, 62. The low-to-high controller 60 causes the ABS 50 to execute a low-to-high pressure control algorithm on the lower-mu wheel while the split-to-high controller 62 causes the ABS 50 to execute a split-to-high pressure control algorithm on the higher-mu wheel.

While the best mode for carrying out the invention has been described in detail, those familiar with the art to which this invention relates will recognize various alternative designs and embodiments for practicing the invention as defined by the following claims.

What is claimed:

1. A method of modifying an anti-lock brake system on a vehicle braking on a transition from a split-mu surface onto a higher-mu surface during an anti-lock brake system event, the vehicle comprising two wheels aligned on a latitudinal axis of the vehicle and an anti-lock brake system capable of independent cyclic control of brake pressure to each of the wheels with at least one pressure apply stage per anti-lock brake system cycle, the split-mu surface being characterized by one of the wheels on a lower-mu surface and the other wheel on a higher-mu surface, the method comprising the steps of:

(a) measuring a time duration, defined in terms of the anti-lock brake system cycle for the lower-mu wheel;

(b) comparing the time duration to a predetermined threshold;

(c) detecting a split-mu to higher-mu transition if the time duration exceeds the predetermined threshold;

(d) controlling the brake pressure to the lower-mu wheel utilizing a low-to-high pressure control algorithm; and (e) controlling the brake pressure to the higher-mu wheel utilizing a split-to-high pressure control algorithm.

2. The method of claim 1 wherein the two wheels are front wheels of the vehicle.

3. The method of claim 1 wherein steps (a), (b), (c), (d), and (e) are repeated continuously.

4. The method of claim 1 wherein the time duration is the time duration of the pressure apply stage of the anti-lock brake system cycle.

5. The method of claim 1 wherein the low-to-high pressure control algorithm includes a first stage of brake pressure increase.

6. The method of claim 5 wherein the first stage of brake pressure increase is linear.

7. The method of claim 5 wherein the low-to-high pressure control algorithm further includes a second stage of brake pressure increase.

8. The method of claim 7 wherein the second stage of brake pressure increase increases at a higher rate than the first stage of brake pressure increase.

9. The method of claim 5 wherein the low-to-high pressure control algorithm further includes a termination of the anti-lock brake system event occurring after the first stage of brake pressure increase.

10. The method of claim 1 wherein the split-to-high pressure control algorithm includes a first stage of brake pressure increase.

11. The method of claim 10 wherein the first stage of brake pressure increase is linear.

12. The method of claim 10 wherein the split-to-high pressure control algorithm further includes a second stage of brake pressure increase.

13. The method of claim 12 wherein the second stage of brake pressure increase increases at a higher rate than the first stage of brake pressure increase.

14. The method of claim 10 wherein the split-to-high pressure control algorithm further includes a termination of the anti-lock brake system event occurring after the first stage of the brake pressure increase.

15. The method of claim 1 wherein the split-to-high pressure control algorithm differs from the low-to-high pressure control algorithm.

* * * * *